(12) United States Patent
Tang

(10) Patent No.: US 10,945,196 B2
(45) Date of Patent: Mar. 9, 2021

(54) COMMUNICATIONS METHOD, TERMINAL DEVICE AND NETWORK DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 183 days.

(21) Appl. No.: 16/311,109

(22) PCT Filed: Sep. 22, 2016

(86) PCT No.: PCT/CN2016/099762
§ 371 (c)(1),
(2) Date: Dec. 18, 2018

(87) PCT Pub. No.: WO2018/053766
PCT Pub. Date: Mar. 29, 2018

(65) Prior Publication Data
US 2020/0314733 A1   Oct. 1, 2020

(51) Int. Cl.
*H04W 48/14* (2009.01)
*H04W 36/00* (2009.01)
(Continued)

(52) U.S. Cl.
CPC ............ *H04W 48/14* (2013.01); *H04W 24/10* (2013.01); *H04W 48/20* (2013.01); *H04W 64/00* (2013.01);
(Continued)

(58) Field of Classification Search
CPC ..... H04W 16/28; H04W 24/10; H04W 24/02; H04W 24/08; H04W 72/046;
(Continued)

(56) References Cited

U.S. PATENT DOCUMENTS 8,346,282 B1 * 1/2013 Dronamraju .......... H04W 64/00
455/456.1
2006/0239238 A1 * 10/2006 Fernandez-Corbaton ...................
H04B 7/18506
370/342

(Continued)

FOREIGN PATENT DOCUMENTS

CN       104378731 A    2/2015
KR    20160091843 A    8/2016
(Continued)

OTHER PUBLICATIONS

Extended European search report issued in corresponding European application No. 16916505.7 dated May 15, 2019.
(Continued)

*Primary Examiner* — Daniel Lai

(57) ABSTRACT

A communication method, a terminal device and a network device are provided. The communication method includes: a terminal device transmits a predetermined uplink sequence, the uplink sequence is used for indicating that the terminal device has a demand for determining a target network device; the terminal device receives a first downlink message transmitted by a network system according to the uplink sequence; and when the first downlink message is used for identifying a first network device, the terminal device determines that the target network device is the first network device according to the first downlink message, the first network device is determined by the network system according to location information of the terminal device.

18 Claims, 3 Drawing Sheets

(51) Int. Cl.
*H04W 24/10* (2009.01)
*H04W 48/20* (2009.01)
*H04W 64/00* (2009.01)
*H04W 72/04* (2009.01)
*H04W 52/00* (2009.01)

(52) U.S. Cl.
CPC .......... *H04W 72/042* (2013.01); *H04W 36/00* (2013.01); *H04W 52/00* (2013.01)

(58) Field of Classification Search
CPC . H04W 36/30; H04W 72/0446; H04W 36/08; H04W 72/04; H04W 36/0061; H04W 36/0072; H04W 36/0058; H04W 36/0066; H04W 36/0077; H04W 36/0094; H04W 36/06; H04W 36/32; H04W 36/36; H04W 4/02; H04W 4/50; H04W 52/26; H04W 64/003; H04W 48/14; H04W 48/20; H04W 72/042; H04W 64/00; H04B 7/0695; H04B 7/063; H04B 7/04; H04B 7/0626; H04B 7/0632; H04B 7/18545; H04B 17/12; H04B 17/318; H04B 7/0608; H04B 7/0619; H04B 7/0628; H04B 7/088; H04B 17/101; H04B 17/309; H04B 7/06; H04B 7/061; H04B 7/0634; H04B 7/0802; H04B 7/0814; H04B 7/082; H04B 7/0842; H04L 5/0048; H04L 5/0051; H04L 5/0053; H04L 1/0026; H04L 43/08; H04L 5/0057
See application file for complete search history.

(56) References Cited

U.S. PATENT DOCUMENTS

| | | | | |
|---|---|---|---|---|
| 2006/0276227 | A1* | 12/2006 | Dravida | H04B 7/0413 455/562.1 |
| 2008/0198808 | A1* | 8/2008 | Hwang | H04W 36/06 370/331 |
| 2010/0061343 | A1* | 3/2010 | Kazmi | H04W 36/0088 370/332 |
| 2010/0093354 | A1* | 4/2010 | Agashe | H04W 36/04 455/436 |
| 2011/0194551 | A1* | 8/2011 | Lee | H04B 7/0626 370/342 |
| 2014/0004900 | A1* | 1/2014 | Lee | H04W 36/0009 455/525 |
| 2014/0199996 | A1 | 7/2014 | Wang et al. | |
| 2014/0200009 | A1 | 7/2014 | Schier et al. | |
| 2015/0163690 | A1 | 6/2015 | Pani et al. | |
| 2015/0358094 | A1 | 12/2015 | Yi et al. | |
| 2016/0057674 | A1* | 2/2016 | Takeda | H04W 36/16 370/332 |
| 2016/0065320 | A1* | 3/2016 | Berlin | H04B 10/25758 398/37 |

FOREIGN PATENT DOCUMENTS

| | | |
|---|---|---|
| WO | 2014012255 A1 | 1/2014 |
| WO | 2014089051 A1 | 6/2014 |
| WO | 2014161329 A1 | 10/2014 |

OTHER PUBLICATIONS

3GPP TSG RAN WG1 Meeting #86; R1-166901; Gothenburg, Sweden Aug. 22-26, 2016.
3GPP TSG RAN WG1 Meeting #86; R1-166481; Gothenburg, Sweden, Aug. 22-26, 2016.
English translation of China First Office Action for CN Application 201680089096 dated Jun. 16, 2020.
English translation of China Second Office Action for CN Application 201680089096 dated Aug. 31, 2020.
India Examination for IN Application 201817049664 dated Aug. 5, 2020.
English translation of Japan Office Action for JP Application 2019-500586 dated Aug. 7, 2020.

* cited by examiner

100

S110 — A terminal device transmits a predetermined uplink sequence, wherein the uplink sequence is used for indicating that the terminal device has a demand for determining a target network device.

S120 — The terminal device receives a first downlink message transmitted by a network system according to the uplink sequence.

S130 — When the first downlink message is used for identifying a first network device, the terminal device determines that the target network device is the first network device according to the first downlink message, wherein the first network device is determined by the network system according to location information of the terminal device.

S210 — A network system receives a predetermined uplink sequence transmitted by a terminal device, wherein the uplink sequence is used for indicating that the terminal device has a demand for determining a target network device.

S220 — The network system determines to transmit a first downlink message to the terminal device according to the uplink sequence, wherein when the network system determines that the target network device is a first network device according to location information of the terminal device, the first downlink message is used for identifying the first network device.

S230 — The network device transmits the first downlink message to the terminal device, such that the terminal device determines that the target network device is the first network device according to the first downlink message.

FIG. 2

COMMUNICATIONS METHOD, TERMINAL DEVICE AND NETWORK DEVICE

CROSS-REFERENCE TO RELATED APPLICATION(S)

This application is a 371 application of International Application No. PCT/CN2016/099762, filed on Sep. 22, 2016, the entire disclosure of which is hereby incorporated by reference.

TECHNICAL FIELD

The present disclosure relates to the field of communication, and particularly relates to a communication method, a terminal device and a network device.

BACKGROUND

In a communication system, a reference signal is a set of known signals transmitted by a transmitting end for measurement of mobility management at a receiving end. An existing Long Term Evolution (LTE) system includes a variety of downlink reference signals, such as Cell-specific Reference Signal (CRS) and Channel State Information-Reference Signal (CSI-RS).

In the existing LTE system, determination of a target network device for a terminal device (i.e. the terminal device performs the mobility management) is based on the measurement mechanism of performing measurement and decision-making to the downlink reference signal. A network device transmits a downlink reference signal over the whole system bandwidth according to a certain period, and the terminal device measures the received downlink reference signal, such that the terminal device or the network device of a serving cell determines the target network device according to a measurement result. For example, a terminal device in an idle state measures the Reference Signal Receiving Power (RSRP) and/or the Reference Signal Receiving Quality (RSRQ) of the downlink reference signal transmitted by each network device of a plurality of network devices according to a certain period, and the target network device is determined by using an S criterion. For another example, a network device of a serving cell transmits a measurement configuration to a terminal device, the measurement configuration including a measurement object, the terminal measures the downlink reference signal transmitted by a plurality of network devices according to a certain period according to the measurement configuration and reports the measurement result to the network device of the serving cell, such that the network device of the serving cell determines the target network device.

The measurement mechanism will lead to meaningless transmission of a large number of downlink reference signals, which will result in resource waste.

SUMMARY

Implementations of the present disclosure provide a communication method, a terminal device and a network device, which can reduce the meaningless transmission of downlink reference signals and improve resource utilization.

In a first aspect, the present disclosure provides a communication method. The communication method comprises: a terminal device transmits a predetermined uplink sequence, the uplink sequence is used for indicating that the terminal device has a demand for determining a target network device; the terminal device receives a first downlink message transmitted by the network system according to the uplink sequence; and when the first downlink message is used for identifying a first network device, the terminal device determines that the target network device is the first network device according to the first downlink message, wherein the first network device is determined by the network system according to location information of the terminal device.

In a second aspect, the present disclosure provides a communication method. The communication method comprises: a network device receives a predetermined uplink sequence transmitted by a terminal device, the uplink sequence is used for indicating that the terminal device has a demand for determining a target network device; the network device determines to transmit a first downlink message to the terminal device according to the uplink sequence, when the network device determines that the target network device is a first network device according to location information of the terminal device, the first downlink message is used for identifying the first network device; and the network device transmits the first downlink message, such that the terminal device determines that the target network device is the first network device according to the first downlink message.

In a third aspect, the present disclosure provides a terminal device. The terminal device comprises: a processor, a transceiver and a memory. Optionally, the terminal device further comprises a bus system, wherein the transceiver, the memory and the processor are connected through the bus system, the memory is arranged to store instructions, the processor is arranged to execute the instructions stored in the memory to control the transceiver to receive or transmit signals, and when the processor executes the instructions stored in the memory, the processor is enabled to execute the method in the first aspect or any possible implementation mode of the first aspect.

BRIEF DESCRIPTION OF DRAWINGS

In order to more clearly describe the technical solutions of the implementations of the present disclosure, the drawings to be used in the implementations of the present disclosure will be introduced below in brief. Obviously, the drawings described below are only some of the implementations of the present disclosure, and one skilled in the art may obtain other drawings according to these drawings without contributing any inventive labor.

FIG. 1 illustrates a schematic flowchart of a communication method according to an implementation of the present disclosure.

FIG. 2 illustrates a schematic flowchart of a communication method according to another implementation of the present disclosure.

DETAILED DESCRIPTION

Figures 3, 4:
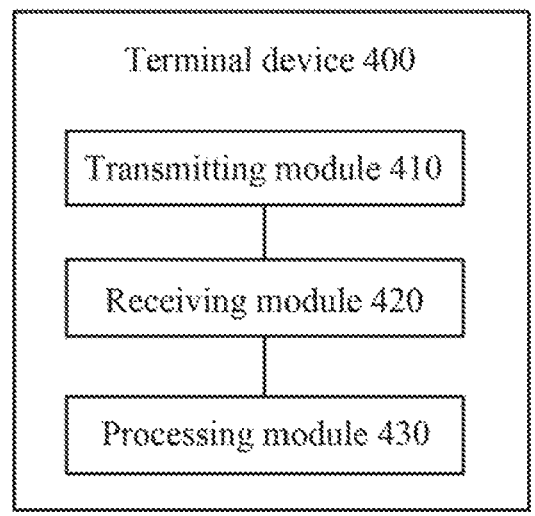
FIG. 3 illustrates a schematic flowchart of a communication method according to another implementation of the present disclosure.
FIG. 4 illustrates a schematic diagram of a terminal device according to an implementation of the present disclosure.

The technical solutions in the implementations of the present disclosure will be clearly and completely described below with reference to the drawings in the implementations of the present disclosure. Obviously, the described implementations are just partial implementations but not all implementations of the present disclosure. All other implementations obtained by one skilled in the art based on the implementations in the present disclosure without contributing any inventive labor shall be included in the protection scope of the present disclosure.

The technical solutions of the implementations of the present disclosure may be applied to various communication systems of wireless cellular network systems, such as Global System of Mobile Communication (GSM) systems, Code Division Multiple Access (CDMA) systems, Wideband Code Division Multiple Access (WCDMA) systems, General Packet Radio Service (GPRS) systems, LTE systems, Universal Mobile Telecommunications System (UMTS), and future 5G communication systems, which are not limited in the implementations of the present disclosure.

In the implementations of the present disclosure, User Equipment (UE) may be referred to as a terminal, a Mobile Station (MS), a mobile terminal, etc., which may communicate with one or more core networks via a Radio Access Network (RAN). For example, a terminal device may be a mobile phone (or "cellular" phone), a computer with a mobile terminal, etc. For example, terminal devices may also be portable, pocket-size, handheld, computer-built or vehicle-mounted mobile devices, and terminal devices in future 5G network systems that exchange speech and/or data with wireless access networks.

In the implementations of the present disclosure, a network device may be a controller for a cell, and the network device may be used to control the corresponding cell to receive and transmit information or signals. For example, the network device in the implementations of the present disclosure may correspond to an antenna of a base station, N antennas of the base station correspond to N network devices one to one, and the N network devices control N cells respectively.

In the implementations of the present disclosure, a network system may comprise one network device, or a network system may comprise a plurality of network devices capable of communicating with each other, and the plurality of network systems are physically connected or logically connected. For example, the network system may correspond to a base station, and the network devices in the network system may correspond to antennas in the base station.

In the implementations of the present disclosure, a base station may be a Long Term Evolution (LTE) system or its evolved system or an Evolutional Node B (eNB or e-Node B) in a future 5G network system, a macro base station, a micro base station (also known as a "small base station"), a pico base station, an Access Point (AP) or a Transmission Point (TP), etc., which is not limited in the present disclosure.

In a first aspect, the present disclosure provides a communication method. The communication method comprises: a terminal device transmits a predetermined uplink sequence, the uplink sequence is used for indicating that the terminal device has a demand for determining a target network device; the terminal device receives a first downlink message transmitted by the network system according to the uplink sequence; and when the first downlink message is used for identifying a first network device, the terminal device determines that the target network device is the first network device according to the first downlink message, wherein the first network device is determined by the network system according to location information of the terminal device.

In this solution, the terminal device does not need to periodically receive the downlink reference signal transmitted by the network device, and the terminal device can transmit the uplink sequence to the network system when the terminal device has the demand. Under a situation that the network system can determine the target network device for the terminal device according to the location information of the terminal device, by transmitting the first downlink message to notify the terminal device, the resource utilization can be improved and the resource waste can be reduced. Further, the determination mechanism of the target network device based on location information is easy to operate and has good compatibility with existing technologies.

In a possible implementation mode of the first aspect, the location information comprises actual location information received by the network system from the terminal device, the actual location information being used for indicating the location of the terminal device; or the location information comprises reference location information of the terminal device determined by the network system according to receiving time points when a plurality of second network devices in the network system receive the uplink sequence and/or path losses of receiving the uplink sequence by a plurality of third network devices in the network system.

In this solution, the location information is acquired by the network system by various ways, the acquisition ways of the location information are flexible, the probability that the network system determines the target network device for the terminal device can be improved, and the solution is flexible to operate and easy to implement.

In a possible implementation mode of the first aspect, the communication method further comprises: the terminal device transmits actual location information used for indicating the location of the terminal device, such that the network system determines that the target network device is the first network device or determines that the terminal device needs to measure the downlink reference signal according to the actual location information.

In this solution, when the terminal device transmits the predetermined uplink sequence, the terminal device may transmit the actual location information along with the uplink sequence, such that the network system may directly perform related operations according to the actual location information.

In a possible implementation mode of the first aspect, when the first downlink message is used for instructing the terminal device to measure a downlink reference signal transmitted by each fourth network device of a plurality of fourth network devices in the network system, the terminal device determines the target network device by measuring the downlink reference signal transmitted by the each fourth network device.

In this solution, although the mechanism of measuring the downlink reference signal is still used to obtain the target network device, after the network system receives the uplink sequence transmitted by the terminal device, only under the situation that it determines a plurality of fourth network devices to transmit the downlink reference signal, the downlink reference signal or dense downlink reference signal is transmitted by the plurality of the fourth network devices, thus the system resources can be saved and the resource utilization is improved.

In a possible implementation mode of the first aspect, before the terminal device transmits the predetermined uplink sequence, the communication method further comprises: the terminal device receives the downlink reference signal transmitted by a plurality of fifth network devices in the network system at a first density. Transmitting by the terminal device the predetermined uplink sequence comprises: the terminal device transmits the uplink sequence when a trigger condition is satisfied. Determining by the terminal device the target network device by measuring the downlink reference signal transmitted by the each fourth network device comprises: the terminal device determines the target network device by measuring the downlink reference signal transmitted by the each fourth network device at a second density, the second density being greater than the first density.

In this solution, although the target network device is obtained still based on the mechanism of measuring the reference signal, network devices in the system firstly transmit sparse downlink reference signals, and only under the situation that a plurality of fourth network devices are determined to transmit the downlink reference signal, the plurality of fourth network devices transmit dense downlink reference signals. Thus the system resources can be saved and the resource utilization is improved.

In a possible implementation mode of the first aspect, determining by the terminal device the target network device by measuring the downlink reference signal transmitted by the each fourth network device comprises: the terminal device measures the downlink reference signal transmitted by the each fourth network device and generates a measurement report; the terminal device transmits the measurement report to a sixth network device in the network system, the six network device comprising a network device of a serving cell of the terminal device; the terminal device receives a second downlink message transmitted by the sixth network device according to the measurement report, the second downlink message being used for identifying a seventh network device; and the terminal device determines that the seventh network device is the target network device according to the second downlink message.

In this solution, the terminal device may report the measurement report to the network system, such that the network system can determine the target network device for the terminal device according to the measurement report.

In a possible implementation mode of the first aspect, the first downlink message comprises resource information and/or parameter information, the resource information is used for indicating a resource occupied by the each fourth network device for transmitting the downlink reference signal, and the parameter information is used for indicating parameters used by the each fourth network device for transmitting the downlink reference signal. Determining by the terminal device the target network device by measuring the downlink reference signal transmitted by the each fourth network device comprises: the terminal device measures the downlink reference signal transmitted by the each fourth network device according to the resource information and/or parameter information to determine the target network device.

In the solution, the terminal device may measure the downlink reference signal according to the resource information and/or parameter information, and the flexibility of this solution is high.

In a possible implementation mode of the first aspect, the first downlink message comprises indication information used for indicating the terminal device, such that the terminal device in an idle state determines that the first downlink message belongs to the terminal device according to the indication information.

In this solution, the terminal device in the idle state can determine its own first downlink message according to the indication information, such that this solution has operability.

In a possible implementation mode of the first aspect, the indication information comprises the uplink sequence or an index of the uplink sequence.

In a possible implementation mode of the first aspect, before the terminal device receives the first downlink message transmitted by the network system according to the uplink sequence, the communication method further comprises: the terminal device transmits actual location information used for indicating the location of the terminal device and/or identification information used for identifying the terminal device; and when the terminal device transmits the actual location information, the indication information comprises the actual location information, or when the terminal device transmits the identification information, the indication information comprises the identification information.

In this solution, the indication information may comprise various types of information, and the operability of this solution can be improved.

Optionally, in a possible implementation mode of the first aspect, transmitting by the terminal device the location information used for indicating the location of the terminal device and/or the identification information used for identifying the terminal device comprises: the terminal device transmits an uplink message, the uplink message comprising the location information and/or the identification information.

In this solution, the terminal device may transmit the location information and/or the identification information through a single message, thereby reducing signaling overhead.

Optionally, in a possible implementation mode of the first aspect, transmitting by the terminal device the uplink message comprises: the terminal device transmits the uplink message according to a time domain offset and/or a frequency domain offset, wherein the time domain offset comprises an offset between time domain resources occupied by the predetermined uplink sequence and the uplink message, and the frequency domain offset comprises an offset between frequency domain resources occupied by the predetermined uplink sequence and the uplink message.

In this solution, the terminal device may transmit the uplink message according to the time domain offset and/or frequency domain offset, such that the resource occupied by the predetermined uplink sequence and the resource occupied by the uplink message have a corresponding relationship, such that the network device receiving the predetermined uplink sequence may, after receiving the predetermined uplink sequence, receive the uplink message transmitted by the same terminal device on the corresponding resource.

In a possible implementation mode of the first aspect, transmitting by the terminal device the predetermined uplink sequence comprises: the terminal device transmits the uplink sequence when a trigger condition is satisfied, wherein the trigger condition comprises at least one of the following conditions: receiving power of receiving the downlink signal transmitted by the sixth network device in the network system is smaller than a power threshold; the sixth network device comprises a network device in a serving cell of the terminal device or a network device in a residing cell of the terminal device; and the terminal device is located in a predetermined area of the sixth network device.

In this solution, the terminal device may transmit the uplink sequence based on its own needs, and thus the user experience of the terminal device can be improved.

In a possible implementation mode of the first aspect, the communication method further comprises: the terminal device receives power information used for indicating transmitting power of the uplink sequence. Transmitting by the terminal device the predetermined uplink sequence comprises: the terminal device transmits the uplink sequence according to the power information.

In this solution, the terminal device may transmit the uplink sequence according to power information, such that the network system may know the transmitting power of the terminal device and thereby determine the path loss of receiving the uplink sequence.

In a second aspect, the present disclosure provides a communication method. The communication method comprises: a network device receives a predetermined uplink sequence transmitted by a terminal device, the uplink sequence is used for indicating that the terminal device has a demand for determining a target network device; the network device determines to transmit a first downlink message to the terminal device according to the uplink sequence, when the network device determines that the target network device is a first network device according to location information of the terminal device, the first downlink message is used for identifying the first network device; and the network device transmits the first downlink message, such that the terminal device determines that the target network device is the first network device according to the first downlink message.

In this solution, when the terminal device has a demand, under a situation that the network device may determine the target network device according to the location information of the terminal device, the network device may determine the target network device according to the location information of the terminal device. In this solution, the network device does not need to periodically transmit the downlink reference signal or dense downlink reference signal, the system resources can be saved and the resource utilization can be improved.

Optionally, in a possible implementation mode of the second aspect, the uplink sequence comprises an uplink sequence known to a plurality of network devices.

In a possible implementation mode of the second aspect, the communication method further comprises: the network device acquires location information of the terminal device.

In a possible implementation mode of the second aspect, acquiring by the network device the location information of the terminal device comprises: the network device receives actual location information of the terminal device transmitted by the terminal device, the actual location information being used for indicating the location of the terminal device, and the location information comprises the actual location information.

In this solution, the network device may directly receive the actual location information transmitted by the terminal device, and this solution is simple to operate and easy to implement.

In a possible implementation mode of the second aspect, acquiring by the network device the location information of the terminal device comprises: the network device determines reference location information of the terminal device by acquiring receiving time points when a plurality of second network devices receive the uplink sequence and/or path losses of receiving the uplink sequence by a plurality of third network devices, and the location information comprises the reference location information.

In this solution, the network device may acquire the reference location information of the terminal device by various ways, and thus the operability of this solution is improved.

In a possible implementation mode of the second aspect, when the network device determines that the terminal device needs to measure a downlink reference signal, the first downlink message is used for instructing the terminal device to measure the downlink reference signal transmitted by each fourth network device of a plurality of fourth network devices.

In this solution, although the target network device is determined still based on the mechanism of measuring the reference signal, the network device does not need to periodically transmit the downlink reference signal or dense downlink reference signals, the resource waste can be reduced and the resource utilization is improved.

In a possible implementation mode of the second aspect, the plurality of fourth network devices comprises the network device, and the communication method further comprises: the network device transmits the downlink reference signal.

In a possible implementation mode of the second aspect, before the network device receives the predetermined uplink sequence of the network device transmitted by the terminal device, the communication method further comprises: the network device transmits the downlink reference signal at a first density. Transmitting by the network device the downlink reference signal comprises: the network device transmits the downlink reference signal at a second density, the second density being greater than the first density.

In this solution, the network device may firstly transmit the downlink reference signal with sparse time domain and frequency domain density, and transmit the downlink reference signal with dense time domain and frequency domain density when it is determined that the downlink reference signal is to be transmitted.

In a possible implementation mode of the second aspect, the communication method further comprises: the network device receives a measurement report transmitted by the terminal device, the measurement report is used for indicating a measurement result of measuring the downlink reference signal transmitted by the each fourth network device by the terminal device; the network device determines that a seventh network device in the network system is the target network device according to the measurement report; and the network device transmits a second downlink message to the terminal device, the second downlink message being used for identifying the seventh network device, such that the terminal device determines that the seventh network device is the target network device according to the first downlink message.

In a possible implementation mode of the second aspect, the first downlink message comprises resource information and/or parameter information, the resource information is used for indicating a resource occupied by the each fourth network device for transmitting the downlink reference signal, and the parameter information is used for indicating parameters used by the each fourth network device for transmitting the downlink reference signal.

In a possible implementation mode of the second aspect, the first downlink message comprises indication information used for indicating the terminal device, such that the terminal device in an idle state determines that the first downlink message belongs to the terminal device according to the indication information.

In this solution, through the indication of the indication information, the terminal device in the idle state can determine the first downlink message that belongs to the terminal device.

In a possible implementation mode of the second aspect, the indication information comprises the uplink sequence or an index of the uplink sequence.

In a possible implementation mode of the second aspect, the communication method further comprises: the network device receives actual location information transmitted by the terminal device and used for indicating the location of the terminal device and/or identification information transmitted by the terminal device and used for identifying the terminal device; when the network device receives the actual location information, the indication information comprises the actual location information; or when the network device receives the identification information, the indication information comprises the identification information.

In this solution, the network device may indicate the terminal device to determine the first downlink message which belongs to the terminal device by various ways, and the flexibility of this solution is high.

In a possible implementation mode of the second aspect, the communication method further comprises: the network device transmits power information used for indicating transmitting power of the uplink sequence to the terminal device.

In this solution, the network device may configure the transmitting power for the terminal device, such that the network device may determine the location information of the terminal device based on the transmitting power, and this solution is simple to operate and easy to implement.

In a third aspect, the present disclosure provides a terminal device used for executing the method in the first aspect or any possible implementation mode of the first aspect. Specifically, the terminal device comprises modules used for executing the method in the first aspect or any possible implementation mode of the first aspect.

In a fourth aspect, the present disclosure provides a network device used for executing the method in the second aspect or any possible implementation mode of the second aspect. Specifically, the network device comprises modules arranged to execute the method in the second aspect or any possible implementation mode of the second aspect.

In a fifth aspect, the present disclosure provides a terminal device. The terminal device comprises: a processor, a transceiver and a memory. Optionally, the terminal device further comprises a bus system, wherein the transceiver, the memory and the processor are connected through the bus system, the memory is arranged to store instructions, the processor is arranged to execute the instructions stored in the memory to control the transceiver to receive or transmit signals, and when the processor executes the instructions stored in the memory, the processor is enabled to execute the method in the first aspect or any possible implementation mode of the first aspect.

In a sixth aspect, the present disclosure provides a network device. The network device comprises: a processor, a transceiver and a memory. Optionally, the network device further comprises a bus system, wherein the transceiver, the memory and the processor are connected through the bus system, the memory is arranged to store instructions, the processor is arranged to execute the instructions stored in the memory to control the transceiver to receive or transmit signals, and when the processor executes the instructions stored in the memory, the processor is enabled to execute the method in the second aspect or any possible implementation mode of the second aspect.

In a seventh aspect, the present disclosure provides a computer storage medium, program codes are stored in the computer storage medium, and the program codes are arranged to instruct execution of the method in the first aspect or any possible implementation mode of the first aspect.

In an eighth aspect, the present disclosure provides a computer storage medium, program codes are stored in the computer storage medium, and the program codes are arranged to instruct execution of the method in the second aspect or any possible implementation mode of the second aspect.

The implementations of the present disclosure will be described below in detail in combination with specific examples. It shall be understood that these examples are intended only to help one skilled in the art to better understand the implementations of the present disclosure but not to limit the scope of the implementations of the present disclosure.

It shall also be understood that, in the implementations of the present disclosure, network devices numbered "first", "second", "third" and the like are used to distinguish network devices performing different operations. Whether the first network device, the second network device, the third network device and so on are the same network device needs to be determined according to the actual situation.

The communication methods in the implementations of the present disclosure will be described below in detail with reference to FIG. 1 to FIG. 3.

FIG. 1 illustrates a schematic flowchart of a communication method 100 according to an implementation of the present disclosure. FIG. 1 illustrates the acts or operations of the communication method 100, but these acts or operations are only examples, and in the implementations of the present disclosure, other operations or variations of the operations in FIG. 1 may also be performed. In addition, the acts in FIG. 1 may be performed in a different sequence from that is presented in FIG. 1, and it may be not necessary to perform all of the acts in FIG. 1. The communication method 100 may comprise acts S110-S130:

In S110, a terminal device transmits a predetermined uplink sequence, wherein the uplink sequence is used for indicating that the terminal device has a demand for determining a target network device.

In S120, the terminal device receives a first downlink message transmitted by a network system according to the uplink sequence.

In S130, when the first downlink message is used for identifying a first network device, the terminal device determines that the target network device is the first network device according to the first downlink message, wherein the first network device is determined by the network system according to location information of the terminal device.

FIG. 2 illustrates a schematic flowchart of a communication method 200 according to an implementation of the present disclosure. FIG. 2 illustrates the acts or operations of the communication method 200, but these acts or operations are only examples, and in the implementations of the present disclosure, other operations or variations of the operations in FIG. 2 may also be performed. In addition, the acts in FIG. 2 may be performed in a different sequence from that presented in FIG. 2, and it may be not necessary to perform all of the acts in FIG. 2. The communication method 200 may comprise acts S210-S230:

In S210, a network system receives a predetermined uplink sequence transmitted by a terminal device, wherein the uplink sequence is used for indicating that the terminal device has a demand for determining a target network device.

In S220, the network system determines to transmit a first downlink message to the terminal device according to the uplink sequence, and when the network system determines that the target network device is a first network device according to location information of the terminal device, the first downlink message is used for identifying the first network device.

In S230, the network device transmits the first downlink message to the terminal device, such that the terminal device determines that the target network device is the first network device according to the first downlink message.

Specifically, the terminal device may transmit an uplink sequence according to its own demand (such as a demand for mobility management). After the network system receives the uplink sequence, the network system may know that the terminal device has a demand for determining the target network device. Under a situation that the network system can determine the target network device according to the location information of the terminal device, the terminal device may receive the first downlink message transmitted by the network system and used for identifying the target network device. For example, when the network system determines that the target network device of the terminal device is the first network device, the network system may transmit the first downlink message used for identifying the first network device to the terminal device. Alternatively, the first downlink message may comprise first information used for identifying the first network device (the first information may be an ID of the first network device). Thus, after receiving the first downlink message, the terminal device knows (e.g., according to the first information) that the first network device is the target network device determined by the network system for the terminal device.

It shall be understood that the network system may comprise the first network device, or may not comprise the first network device, which is not limited in the implementations of the present disclosure. Preferably, the network system comprises the first network device.

It shall be noted that the operation that the network system transmits the first downlink message to the terminal device refers to the operation that a network device in the network system transmits the first downlink message to the terminal device.

For example, when the terminal device is in a connected state, the network system may comprise a network device in a serving cell of the terminal device, and after a plurality of network devices in the network system negotiate to determine that the target network device is the first network device, the network device in the serving cell of the terminal device may transmit the first downlink message used for indicating the first network device to the terminal device.

For another example, when the terminal device is in an idle state, a plurality of network devices in the network system may negotiate to determine that a network device with the smallest load transmits the first downlink message to the terminal device. Further, if the network system can acquire the location information of the terminal device, the network system may determine the network device that transmits the first downlink message according to the location of the terminal device. For example, the network system may determine that a network device nearest to the location of the terminal device transmits the first downlink message to the terminal device. Further, if a load of the network device nearest to the location of the terminal device is high, the network system may determine that the network device nearer to the location of the terminal device and with a lower load transmits the first downlink message to the terminal device. When the network system determines that the network device transmitting the first downlink message to the terminal device is a network device A according to the location information of the terminal device and/or loads of the plurality of network devices in the network system, the network device A transmits the first downlink message to the terminal device.

It needs to be noted that, in the implementations of the present disclosure, the network device no longer periodically transmits the downlink reference signal; or the network device periodically transmits the downlink reference signal with sparse time domain and/or frequency domain density (in the prior art, the network device periodically transmits the downlink reference signal with dense time domain and/or frequency domain density). Herein, the sparse downlink reference signals may be understood as few downlink reference signals transmitted by the network device on a certain size of resource.

Therefore, the terminal device may transmit the uplink sequence to the network system when the terminal device has a demand. Under the situation that the network system can determine the target network device according to the uplink sequence (i.e., determine that the target network device is the first network device), the network system may transmit the first downlink message used for indicating the first network device to the terminal device, and the terminal device may receive the first downlink message used for indicating the first network device, thus meaningless transmission of the downlink reference signal can be reduced, the resource waste is reduced and the resource utilization is improved. Further, as compared with the measurement mechanism in which the terminal device determines the target network device depending on the downlink reference signal, in this solution, the terminal device may not measure the downlink reference signal, and thus not only can the signaling overhead be reduced, but also the process that the terminal device determines the target network device can be simplified.

As an optional implementation, the network system may comprise a plurality of network devices, which are capable of communicating (i.e., exchanging information) with each other. The predetermined uplink sequence may also be understood as an uplink sequence known to the network system, which may mean that the resource (e.g., the location in a time domain and/or frequency domain) for transmitting the uplink sequence and/or the uplink sequence adopted is known to a plurality of network devices in the network system. This can be achieved through an agreement beforehand in a protocol or an coordination between a plurality of network devices in the network system. For example, the resource occupied by the uplink sequence (such as the location in the time domain and/or frequency domain) and/or the uplink sequence (or sequence group) adopted may be broadcast over a downlink broadcast channel of a network device in the network system. Based on this, there may be multiple transmitting modes for transmitting the predetermined uplink sequence by the terminal device.

For example, when the terminal device is in a connected state, the network system may comprise a network device in a serving cell and a network device in a neighboring cell of the serving cell. The terminal device may transmit the uplink sequence to the network device of its serving cell, and the network device in the neighboring cell of the serving cell may also detect (or receive) the uplink sequence.

For another example, when the terminal device is in an idle state, the network system may comprise a network device in a residing cell and a network device in a neighboring cell of the residing cell, the terminal device may transmit the uplink sequence to the network device of its current residing cell, and since the uplink sequence is predetermined by the network system, the network device in the neighboring cell of the residing cell may also detect the uplink sequence.

For another example, the terminal device may transmit the uplink sequence by broadcasting, such that the plurality of network devices in the network system can detect the uplink sequence.

It needs to be noted that no matter how the terminal device transmits the uplink sequence, since the uplink sequence is predetermined (or known) by the network system, the plurality of network devices in the network system can detect the uplink sequence.

Optionally, in an implementation of the present disclosure, the uplink sequence may be selected by the terminal device from a sequence group. The sequence group may be agreed in a protocol or may be notified by a network device in the network system to the terminal device through a downlink broadcast channel. The sequence group may be an existing sequence group in a standard, such that the uplink sequence is an existing sequence selected from the existing sequence group, e.g., a preamble of a Physical Random Access Channel (PRACH). Or, the sequence group may be a sequence group specially defined. For example, according to a logical index RACH_Root_SEQUENCE (Z-C sequence), a sequence group consisting of sequences of different lengths or phases from the current PRACH preamble is obtained.

When the uplink sequence group is an existing sequence group such that the uplink sequence is an existing sequence selected from the existing sequence group, the terminal device may transmit the uplink sequence by a number of ways such that the network system (the network device receiving the uplink sequence) determines whether the existing sequence is used for indicating that the terminal device has a demand for determining a target network device. For the sake of simplicity, "the uplink sequence is used for indicating that the terminal device has a demand for determining a target network device" may be referred to as "the uplink sequence is used for indicating a demand of the terminal device" for short.

As an optional implementation, the terminal device may transmit the existing sequence on a resource corresponding to the existing sequence used for indicating the demand of the terminal device. In other words, in the implementation of the present disclosure, the resource for the terminal device to transmit the existing sequence (e.g., the location in the time domain and/or frequency domain) is different from that for the terminal device to transmit the existing sequence in the prior art. For example, the terminal device transmits the PRACH preamble on a first resource during random access, and the terminal device transmits the PRACH preamble on a second resource when having the demand. Thus, the network system may distinguish between the PRACH preamble for random access and the PRACH preamble used for indicating the demand of the terminal device according to the resources occupied by the existing sequence.

As an optional implementation, the network system may pre-configure some of the existing sequences in the existing sequence group for specially indicating the demand of the terminal device. For example, the network system may pre-configure N sequences in the PRACH preamble for specially indicating the demand of the terminal device, such that, when the network system receives a sequence of these N sequences, the network system may determine that the terminal device has a demand for determining the target network device, wherein N is greater than or equal to 1.

Optionally, in an implementation of the present disclosure, the predetermined uplink sequence may comprise a predetermined uplink signal (which is also a sequence), and the predetermined uplink signal may be an existing uplink signal in a standard, such as a Sounding Reference Signal (SRS). The predetermined uplink signal may be a signal of a Physical Uplink Control Channel (PUCCH), such as a Scheduling Request (SR). If the terminal device uses the existing uplink signal to indicate the demand of the terminal device, similar to what is described above, the resource and/or format of the existing uplink signal used for indicating the demand of the terminal device is different from the resource and/or format of the existing uplink signal in the prior art, such that the network device receiving the uplink signal may identify the existing uplink signal used for indicating the demand of the terminal device.

In the above, it is described with reference to FIGS. 1 and 2 that the terminal device in the implementations of the present disclosure may transmit the uplink sequence to the network device according to its own demand. Optionally, in an implementation of the present disclosure, the first downlink message received by the terminal device may at least include the following two situations:

Situation 1

Similar to the description above, when the network system determines that the target network device is the first network device (in other words, when the network system can determine the target network device), the network system may transmit the first downlink message used for indicating the first network device to the terminal device. After receiving the first downlink message, the terminal device may determine that the target network device is the first network device. In short, in this solution, the network system may acquire the location information of the terminal device, determine the target network device according to the location information, and transmit the first downlink message to notify the terminal device.

Herein, the first network device is determined by the network system according to the location information of the terminal device. The network system may acquire the location information by at least following ways:

(1) The location information may comprise actual location information used for indicating the location of the terminal device. That is, the terminal device may transmit the actual location information to the network system. After receiving the actual location information, the network system may determine that the target network device is the first network device according to the actual location information.

Specifically, when the terminal device transmits the uplink sequence, it can transmit the actual location information with the uplink sequence. After receiving the actual location information, the network system may select the target network device for the terminal device according to the actual location information (the way of transmitting the actual location information will be described in detail later). For example, the network system may select the first network device nearest to the terminal device as the target network device. For another example, the network system may select the first network device nearer to the terminal device and with a smaller load as the target network device.

It needs to be noted that the first network device identified by the first downlink message may be determined by a network device in the network system according to the location information of the terminal device. For example, after acquiring the actual location information of the terminal device, the network device in the serving cell may directly select the target network device for the terminal device. The first network device identified by the first downlink message may be determined by a plurality of network devices in the network system through negotiation based on the location information of the terminal device, and the plurality of network devices may negotiate to determine a preferable target network device. For example, negotiating by the plurality of network devices to determine the target network device may comprise that the plurality of network devices determine the target network device in consideration of their own load situations, load situations of other network devices and the location of the terminal device.

(2) The location information may comprise reference location information of the terminal device determined by the network system according to receiving time points when a plurality of second network devices in the network system receive the uplink sequence and/or path losses of receiving the uplink sequence by a plurality of third network devices in the network system.

For example, after receiving the uplink sequence, network devices in the network system may interchange their receiving time points when the network devices receive the uplink sequence. For the sake of distinguishing, reference location information acquired according to the receiving time points may be referred to as first reference location information. For example, the network system determines the first reference location information of the terminal device according to the receiving time points when a second network device A, a second network device B and a second network device C receive the uplink sequence. Thus, the network system may determine the target network device according to the first reference location information.

For example, if a plurality of second network devices comprise three second network devices, supposing that coordinates of the second network device A are $(a_1, b_1)$, coordinates of the second network device B are $(a_2, b_2)$ and coordinates of the second network device C are $(a_3, b_3)$, a time difference between the receiving time point when A receives the uplink sequence and the receiving time point when B receives the uplink sequence is $\Delta t_1$, a time difference between the receiving time point when A receives the uplink sequence and the receiving time point when C receives the uplink sequence is $\Delta t_2$, assuming that the location of the terminal device is $(x, y)$, and the duration spent by A in receiving the uplink sequence is $t_1$, the network system may determine the first reference location information of the terminal device according to formulas (1) to (3).

$$\sqrt{(a_1-x)^2+(b_1-y)^2}=t_1 v; \quad (1)$$

$$\sqrt{(a_2-x)^2+(b_2-y)^2}=(t_1+\Delta t_1)v; \quad (2)$$

$$\sqrt{(a_3-x)^2+(b_3-y)^2}=(t_1+\Delta t_2)v; \quad (3)$$

wherein $v=3.0 \cdot 10^8$ m/s. The network system may determine the first reference location information of the terminal device according to the above formulas (1) to (3), such that it may determine that the target network device is the first network device according to the first reference location information of the terminal device.

For another example, after receiving the uplink sequence, network devices in the network system may interchange path losses (or receiving powers) of receiving the uplink sequence by the network devices. Herein, the path loss of receiving the uplink sequence by any network device is equal to a power difference between the receiving power of receiving the uplink sequence by the any network device and the transmitting power of transmitting the uplink sequence by the terminal device. For the sake of distinguishing, the reference location information acquired according to the path losses may be referred to as second reference location information. The network system may determine the second reference location information of the terminal device according to the path losses of receiving the uplink sequence by a third network device D, a third network device E and a third network device F. Thus, the network system may determine the target network device according to the second reference location information.

It needs to be noted that the transmitting power of the uplink sequence is known to the network system, such that the network device in the network system may determine the path loss of the uplink sequence according to the transmitting power of the uplink sequence and the receiving power of the uplink sequence. For example, the network system (a network device in the network system) may transmit power information used for indicating the transmitting power of the uplink sequence to the terminal device. For another example, the network system may broadcast the power information through a broadcast message. For another example, the transmitting power of the uplink sequence may be agreed in advance by the terminal device and the network system, such that the terminal device may transmit the uplink sequence according to the agreed transmitting power. Correspondingly, after receiving the power information, the terminal device may transmit the uplink sequence using the transmitting power indicated by the power information.

It also needs to be noted that the plurality of second network devices and the plurality of third network devices may comprise the same network device or not comprise the same network device, which is not limited in the implementations of the present disclosure.

For another example, after receiving the uplink sequence, network devices in the network system may interchange the receiving time points when the network devices receive the uplink sequence and the path losses (or receiving powers) of receiving the uplink sequence by the network devices. For example, the network system may acquire the receiving time point when the second network device A receives the uplink sequence, the receiving time point when the second network device B receives the uplink sequence, and the path loss of receiving the uplink sequence by the third network device C, and determine the reference location information of the terminal device.

Regardless of how the network system acquires the location information of the terminal device and whether the acquired location information is the reference location information or the actual location information, as long as the network system can determine that the target network device is the first network device according to the location information, the network system may transmit the first downlink message used for identifying the first network device to the terminal device, such that the terminal device can directly determine that the target network device is the first network device according to the first downlink message.

Situation 2

After the network system receives the uplink sequence and when the network system determines that the terminal device needs to measure a reference signal (in other words, the network system may not be able to determine the target network device after receiving the uplink sequence), the network system needs to instruct the terminal device to acquire the target network device based on a measurement of the reference signal. That is, the network system transmits a first downlink message to the terminal device to instruct the terminal device to measure the downlink reference signal transmitted by each fourth network device of a plurality of fourth network devices in the network system. After receiving the first downlink message, the terminal device may determine the target network device by measuring the downlink reference signal transmitted by each fourth network device.

Herein, the situations that the network system may not be able to determine the target network device after receiving the uplink sequence may include at least the following:

(1) There are not enough network devices in the network system that detect the uplink sequence, such that the network system cannot estimate the reference location information of the terminal device.

(2) The location information acquired by the network system in different ways is greatly different. For example, two kinds of reference location information acquired by the network system according to receiving time points and according to path losses are greatly different. For another example, the actual location information and the reference location information acquired by the network system are greatly different.

When the network system determines that the terminal device needs to measure the downlink reference signal, the network system may transmit the first downlink message to the terminal device, the first downlink message is used for instructing the terminal device to measure the downlink reference signal transmitted by each fourth network device of the plurality of fourth network devices in the network system; and after receiving the first downlink message, the terminal device may determine the target network device by measuring the downlink reference signal transmitted by each fourth network device.

It needs to be noted that the network system may determine a plurality of fourth network devices to transmit the downlink reference signal. For example, when N network devices in the network system receive the uplink sequence, the network system may determine that M fourth network devices of the N network devices transmit the downlink reference signal, wherein N≥2 and 2≤M≤N.

In the situation 2, when the terminal device is in a different state, the manner in which the terminal device determines the target network device is different.

Optionally, in the implementations of the present disclosure, supposing that L fifth network devices in the network system transmit the downlink reference signal at a first density, when the network system determines that the terminal device needs to measure the downlink reference signal, the network system may determine K fourth network devices to transmit the downlink reference signal at a second density. In such a case, the K fourth network devices need to transmit the downlink reference signal at the second density. Herein, the same network devices among the L fifth network devices and the K fourth network devices need to transmit the downlink reference signal at the second density, while the network devices among the L fifth network devices which are different from the K fourth network devices still transmit the downlink reference signal at the first density. For example, the network system comprises a network device A, a network device B and a network device C, the three network devices transmit the downlink reference signal at the first density, the terminal device needs to measure the network device B and network device C when the network system receives the uplink sequence, then the network device A still transmits the downlink reference signal at the first density, and the network device B and network device C need to transmit the downlink reference signal at the second density.

It needs to be noted that the network system may determine the plurality of fourth network devices that transmit the downlink reference signal (or the plurality of fourth network devices that transmit the downlink reference signal at the second density) according to the location information of the terminal device and/or the loads of the network devices in the network system.

As an optional implementation, when the terminal device is in a connected state, after the terminal device receives the first downlink message, the terminal device may measure the downlink reference signal transmitted by each fourth network and generate a measurement report according to the first downlink message, and the terminal device may report the measurement report to a sixth network device (i.e., the network device in the serving cell), such that the serving cell determines that the target network device is a seventh network device according to the measurement report, and the terminal device may directly determine that the target network device is the seventh network device after receiving a second downlink message. In short, when the terminal device is in the connected state, the terminal device may measure each fourth network device according to the first downlink message and then report the measurement report to the network device in the serving cell, and the network device in the serving cell may determine the target network device for the terminal device according to the measurement report.

It shall be understood that the first network device and the seventh network device are determined by the network system by different ways, and they may be the same network device or different network devices, which is not limited in the implementations of the present disclosure.

As another optional implementation, when the terminal device is in an idle state, after the terminal device receives the first downlink message, the terminal device may measure the downlink reference signal transmitted by each fourth network device according to the first downlink message, and determine the target network device by itself according to an R criterion. In short, when the terminal device is in the idle state, the terminal device may determine the target network device itself after measuring each fourth network device according to the first downlink message.

Alternatively, in the situation 2, the first downlink message may comprise resource information and/or parameter information, the resource information is used for indicating the resource occupied by each fourth network device for transmitting the downlink reference signal, and the parameter information is used for indicating parameters used by each fourth network device for transmitting the downlink reference signal, wherein, the parameter information may comprise a location of the downlink reference signal in the time domain and frequency domain, sequence information used, orthogonal cover code and so on.

Determining by terminal device the target network device by measuring the downlink reference signal transmitted by each fourth network device may comprise: the terminal device measures the downlink reference signal transmitted by each fourth network device of at least two network devices according to the resource information and/or parameter information to determine the target network device.

Specifically, the network system may transmit the resource information to the terminal device, and each fourth network device transmits the downlink reference signal on the corresponding resource, such that the terminal device may detect the downlink reference signal transmitted by each fourth network device on the corresponding resource after receiving the resource information. The network system may transmit the parameter information to the terminal device, and each fourth network device transmits the downlink reference signal to the terminal device using corresponding parameters, such that the terminal device can receive the downlink reference signal transmitted by each fourth network device correctly after receiving the parameter information.

In this solution, the network system may instruct the terminal device to measure a plurality of fourth network devices when the terminal device has a demand, and inform the terminal device of the resource information of the plurality of fourth network devices, and thus the flexibility of resource allocation is improved.

Optionally, in situation 2, after the network system acquires the location information of the terminal device, the plurality of fourth network devices may transmit the downlink reference signal to the terminal device through beam forming, thus space division multiplexing can be realized and the spectrum utilization is improved.

Based on the above, the terminal device may transmit the predetermined uplink sequence when it has a demand, and the network device learns that the terminal device has a demand for determining the target network device after receiving the uplink sequence. Then the network system may directly inform the terminal device of the target network device determined by the network system by transmitting the first downlink message, such that the terminal device may directly determine the target network device after receiving the first downlink message. Under the situation that the network system determines that the terminal device needs to measure the downlink reference signal (under the situation that the network system is unable to determine the target network device), the network system informs the terminal device to measure the downlink reference signal transmitted by a plurality of fourth network devices by transmitting the first downlink message, such that the terminal device may determine the target network device by measuring the downlink reference signal after receiving the first downlink message.

Optionally, in the implementations of the present disclosure, the first downlink message may comprise indication information used for indicating the terminal device, such that the terminal device in an idle state determines that the first downlink message belongs to the terminal device according to the indication information.

Specifically, if the terminal device is in an idle state, the first downlink message transmitted by the network device needs to comprise the indication information, such that the terminal device in the idle state can determine that the first downlink message belongs to the terminal device according to the indication information, wherein the indication information may comprise many types of information.

For example, the indication information may comprise the uplink sequence or an index of the uplink sequence. After receiving the first downlink message, the terminal device may determine that the first downlink message belongs to the terminal device according to the uplink sequence or the index of the uplink sequence.

For another example, when the terminal device transmits the uplink sequence, the terminal device may transmit the actual location information of the terminal device and/or identification information used for identifying the terminal device along with the uplink sequence.

When the terminal device transmits the actual location information, the first downlink message may comprise the actual location information. After receiving the first downlink message, the terminal device may determine that the first downlink message belongs to the terminal device according to the actual location information.

When the terminal device transmits the identification information, the first downlink message may comprise the identification information. After receiving the first downlink message, the terminal device may determine that the first downlink message belongs to the terminal device according to the identification information.

In other words, the first downlink message may comprise at least one of the uplink sequence, the index of the uplink sequence, the actual location information, and the identification information, such that the terminal device in the idle state may determine that the first downlink message belongs to the terminal device.

It needs to be noted that, when the terminal device is in a connected state, even if the downlink message does not comprise any one of the predetermined uplink sequence, the identification information, and the location information, the terminal device still can determine the first downlink message responsive to the uplink sequence of the terminal device. Thus, optionally, in the implementations of the present disclosure, the terminal device in the connected state may not transmit the actual location information and/or the identification information, and correspondingly the first downlink message may not comprise the predetermined uplink sequence, the identification information, or the actual location information.

Optionally, in the implementations of the present disclosure, when the terminal device transmits the uplink sequence, the terminal device may transmit an uplink message along with the uplink sequence, and the uplink message comprises the actual location information of the terminal device and/or identification information used for identifying the terminal device. That is, transmitting by the terminal device the actual location information and/or identification information may comprise: the terminal device transmits an uplink message, the uplink message comprising the actual location information and/or identification information.

In this solution, the terminal device may transmit the actual location information and/or the identification information through a single message, and thus the signaling overhead can be decreased.

Optionally, in the implementations of the present disclosure, the terminal device may transmit an uplink message according to a time domain offset and/or a frequency domain offset, and the uplink message comprises the location information and/or identification information, wherein the time domain offset comprises an offset between the time domain resources occupied by the uplink sequence and the uplink message, and the frequency domain offset comprises an offset between the frequency domain resources occupied by the uplink sequence and the uplink message.

Specifically, the resource occupied by the terminal device for transmitting the uplink sequence and the resource occupied by the terminal device for transmitting the actual location information and/or the identification information have a corresponding relationship, such that the network system may receive at least one of the actual location information and the identification information, and the uplink sequence, transmitted by the same terminal device on the corresponding resources.

It needs to be noted that there are various ways for the terminal device to acquire the time domain offset and/or frequency domain offset. For example, the terminal device determines the time domain offset and/or frequency domain offset, and the uplink sequence may carry information used for indicating the time domain offset and/or frequency domain offset, such that the network system may receive the actual location information and/or identification information according to the time domain offset and/or the frequency domain offset after receiving the uplink sequence.

For another example, the terminal device and the network system agree the time domain offset and/or frequency domain offset in advance. For another example, a network device in the network system configures the time domain offset and/or frequency domain offset to the terminal device by broadcasting.

Optionally, in the implementations of the present disclosure, transmitting by the terminal device the predetermined uplink sequence may comprise: the terminal device transmits the uplink sequence when a trigger condition is satisfied, wherein the trigger condition comprises at least one of the following conditions:

Condition 1

Receiving power of receiving the downlink signal transmitted by the sixth network device in the network system is smaller than a power threshold; and the sixth network device comprises a network device in a serving cell of the terminal device or a network device in a residing cell of the terminal device.

Specifically, the terminal device may measure the downlink signal transmitted by the network device in the serving cell or the network device in the residing cell, and if the intensity of the downlink signal is smaller than the power threshold, the terminal device may transmit the uplink sequence. For example, if the receiving power (Reference Signal Receiving Power, RSRP) of receiving the downlink signal transmitted by the sixth network device by the terminal device is smaller than the power threshold (it may indicate that the terminal device is located at the edge of the sixth network device), the terminal device transmits the uplink sequence.

It needs to be noted that the situation that the receiving power of receiving the downlink signal transmitted by the sixth network device is smaller than the power threshold in the condition 1 may include the situation that the receiving power of receiving the downlink reference signal transmitted by the sixth network device at the first density is smaller than the power threshold. For example, the terminal device in an idle state detects the downlink reference signal transmitted by the network device in the residing cell at the first density, and if the receiving power of the downlink reference signal at the first density is detected to be less than a receiving threshold, the terminal device may transmit the uplink sequence, such that the network system learns that the terminal device has a demand for determining the target network device and thus performs corresponding operations.

Condition 2

The terminal device is located in a predetermined area of the sixth network device.

Specifically, the predetermined area may be an area pre-configured by the sixth network device for the terminal device, and the predetermined area may be composed of some location coordinates. For example, when coordinates of the terminal device satisfy A<x<B and C<y<D, the terminal device is located in the predetermined area, where (x, y) are the coordinates of the terminal device, A and B are a range of horizontal coordinates, and C and D a range of longitudinal coordinates. The location area may be composed of geographical location areas satisfying certain mathematical relations. For example, when the coordinates of the terminal device satisfy $E<(x-x_0)_2+(y-y_0)_2<F$, the terminal device is located in the predetermined area, wherein $(x_0, y_0)$ are the coordinates of the sixth network device, E and F are distance thresholds, and the predetermined area is a ring area around the sixth network device. The terminal device transmits the uplink sequence to the sixth network device when the terminal device is located in the predetermined area.

Optionally, in the implementations of the present application, the sixth network device may configure the predetermined location to the terminal device by various ways. For example, when the terminal device is in an idle state, the sixth network device may broadcast the predetermined area to the terminal device; and for another example, when the terminal device is in a connected state, the sixth network device may configure the predetermined area to the terminal device by broadcasting, or by using dedicated signaling.

FIG. 3 illustrates a schematic flowchart of a communication method 300 according to an implementation of the present disclosure. FIG. 3 illustrates the acts or operations of the communication method 300, but these acts or operations are only examples, and in the implementations of the present disclosure, other operations or variations of the operations in FIG. 3 may be performed. In addition, the acts in FIG. 3 may be performed in a different sequence from that is presented in FIG. 3, and it may be not necessary to perform all of the acts in FIG. 3. The communication method 300 may comprise the following acts S310-S330.

In S310, a network device receives a predetermined uplink sequence transmitted by a terminal device, wherein the uplink sequence is used for indicating that the terminal device has a demand for determining a target network device.

In S320, the network device determines to transmit a first downlink message to the terminal device according to the uplink sequence, when the network device determines that the target network device is a first network device according to location information of the terminal device, the first downlink message is used for identifying the first network device.

In S330, the network device transmits the first downlink message, such that the terminal device determines that the target network device is the first network device according to the first downlink message.

Specifically, the network device may learn that the terminal device has a demand for determining the target network device after receiving the uplink sequence. Herein, relevant description of the acts of the communication method 300 and various limitations may refer to the relevant description of the communication method 100 and the communication method 200. If the network device may determine the target network device according to the location information of the terminal device, the network device may transmit the first downlink message to the terminal device.

It needs to be noted that the situations where the network device determines the target network device according to the location information of the terminal device may at least comprise the following two situations:

(1) The network device directly determines the target network device for the terminal device according to the location information, wherein the location information comprises the actual location information reported by the terminal device and used for indicating the location of the terminal device. For example, after receiving the uplink sequence, the network device may receive the actual location information transmitted by the terminal device, and the network device may determine the target network device according to the actual location information.

(2) The network device needs to negotiate with other network devices to determine the target network device according to the location information of the terminal device. For example, the uplink sequence is known to a plurality of network devices in a network system. After receiving the uplink sequence, the network device and the plurality of network devices in the network system may negotiate to determine the target network device according to the location information of the terminal device.

Herein, relevant description about the location information of the terminal device and methods for acquiring the location information may refer to the relevant description in the above, which are not repetitively described here for the sake of conciseness.

Optionally, the communication method further comprises: the network device acquires the location information of the terminal device.

Optionally, the location information comprises actual location information transmitted by the terminal device and used for indicating the location of the terminal device.

Optionally, acquiring by the network device the location information of the terminal device comprises: the network device determines reference location information of the terminal device by acquiring receiving time points when a plurality of second network devices receive the uplink sequence and/or path losses of receiving the uplink sequence by a plurality of third network devices, and the location information comprises the reference location information.

Optionally, when the network device determines that the terminal device needs to measure a downlink reference signal, the network device transmits a first downlink message to the terminal device, and the first downlink message is used for instructing the terminal device to measure the downlink reference signal transmitted by each fourth network device of a plurality of fourth network devices.

Optionally, the plurality of fourth network devices comprises the network device, and the communication method further comprises: the network device transmits the downlink reference signal.

Optionally, before the network device receives the predetermined uplink sequence transmitted by the terminal device, the communication method further comprises: the network device transmits the downlink reference signal at a first density; and transmitting by the network device the downlink reference signal comprises: the network device transmits the downlink reference signal at a second density, wherein the second density is greater than the first density.

Optionally, the communication method further comprises: the network device receives a measurement report transmitted by the terminal device, wherein the measurement report is used for indicating a measurement result of measuring the downlink reference signal transmitted by each fourth network device by the terminal device; the network device determines that a seventh network device in the network system is the target network device according to the measurement report; and the network device transmits a second downlink message to the terminal device, wherein the second downlink message is used for identifying the seventh network device, such that the terminal device determines that the seventh network device is the target network device according to the second downlink message.

Optionally, the first downlink message comprises resource information and/or parameter information, wherein the resource information is used for indicating a resource occupied by each fourth network device for transmitting the downlink reference signal, and the parameter information is used for indicating parameters used by each fourth network device for transmitting the downlink reference signal.

Optionally, the first downlink message comprises indication information used for indicating the terminal device, such that the terminal device in an idle state determines that the first downlink message belongs to the terminal device according to the indication information.

Optionally, the indication information comprises the uplink sequence or an index of the uplink sequence.

Optionally, the communication method further comprises: the network device receives actual location information transmitted by the terminal device and used for indicating the location of the terminal device, and/or identification information transmitted by the terminal device and used for identifying the terminal device; when the network device receives the actual location information, the indication information comprises the actual location information; and when the network device receives the identification information, the indication information comprises the identification information.

Optionally, the communication method further comprises: the network device transmits power information used for indicating transmitting power of the uplink sequence to the terminal device.

It needs to be noted that the communication method 300 and the communication method 200 respectively describe the communication methods of the implementations of the present disclosure from an angle of a single network device and from an angle of a network system. Some network devices mentioned in the communication method 300 may be network devices in neighboring cells (i.e., they can communicate with each other). Relevant description in the communication method 300 may refer to the relevant descriptions of the communication method 100 and the communication method 200, which is not repetitively described here for the sake of conciseness.

The communication methods of the implementations of the present disclosure have been described above with reference to FIGS. 1-3. The terminal devices and the network devices of the implementations of the present disclosure will be described below with reference to FIGS. 4-7.

FIG. 4 illustrates a schematic diagram of a terminal device 400 according to an implementation of the present disclosure. As illustrated in FIG. 4, the terminal device 400 comprises: a transmitting module 410 arranged to transmit a predetermined uplink sequence, the uplink sequence being used for indicating that the terminal device has a demand for determining a target network device; a receiving module 420 arranged to receive a first downlink message transmitted by a network system according to the uplink sequence; and a processing module 430 arranged to, when the first downlink message is used for identifying a first network device, determine that the target network device is the first network device according to the first downlink message, wherein the first network device is determined by the network system according to location information of the terminal device.

Optionally, the location information comprises actual location information received by the network system from the terminal device, the actual location information is used for indicating the location of the terminal device; or the location information comprises reference location information of the terminal device determined by the network system according to receiving time points when a plurality of second network devices in the network system receive the uplink sequence and/or path losses of receiving the uplink sequence by a plurality of third network devices in the network system.

Optionally, when the first downlink message is used for instructing the terminal device to measure a downlink reference signal transmitted by each fourth network device of a plurality of fourth network devices in the network system, the processing module 430 is specifically arranged to determine the target network device by measuring the downlink reference signal transmitted by each fourth network device.

Optionally, before the transmitting module 410 transmits the predetermined uplink sequence, the receiving module 420 is further arranged to receive the downlink reference signal transmitted by a plurality of fifth network devices in the network system at a first density; the transmitting module 410 is specifically arranged to transmit the uplink sequence when a trigger condition is satisfied; and the processing module 430 is specifically arranged to determine the target network device by measuring the downlink reference signal transmitted by each fourth network device at a second density, wherein the second density is greater than the first density.

Optionally, the processing module 430 is further arranged to measure the downlink reference signal transmitted by each fourth network device and generate a measurement report; the transmitting module 410 is further arranged to transmit the measurement report to a sixth network device in the network system, the six network device comprising a network device in a serving cell of the terminal device; the receiving module 420 is further arranged to receive a second downlink message transmitted by the sixth network device according to the measurement report, wherein the second downlink message is used for identifying a seventh network device; and the processing module 430 is specifically arranged to determine that the seventh network device is the target network device according to the second downlink message.

Optionally, the first downlink message comprises resource information and/or parameter information, wherein the resource information is used for indicating a resource occupied by each fourth network device for transmitting the downlink reference signal, and the parameter information is used for indicating parameters used by each fourth network device for transmitting the downlink reference signal; and the processing module 430 is specifically arranged to measure the downlink reference signal transmitted by each fourth network device according to the resource information and/or parameter information to determine the target network device.

Optionally, the first downlink message comprises indication information used for indicating the terminal device, such that the terminal device in an idle state determines that the first downlink message belongs to the terminal device according to the indication information.

Optionally, the indication information comprises the uplink sequence or an index of the uplink sequence.

Optionally, before the receiving module 420 receives the first downlink message transmitted by the network system according to the uplink sequence, the transmitting module 410 is further arranged to: transmit actual location information used for indicating the location of the terminal device, wherein the indication information comprises the actual location information; and/or transmit identification information used for identifying the terminal device, wherein the indication information comprises the identification information.

Optionally, the transmitting module 410 is further arranged to transmit the actual location information used for indicating the location of the terminal device, such that the network system determines that the target network device is the first network device or determines that the terminal device needs to measure the downlink reference signal according to the actual location information.

Optionally, the transmitting module 410 is specifically arranged to transmit the uplink sequence when a trigger condition is satisfied, wherein the trigger condition comprises at least one of the following conditions: receiving power of receiving the downlink signal transmitted by the sixth network device in the network system by the receiving module 420 is smaller than a power threshold; the sixth network device comprises a network device in a serving cell of the terminal device or a network device in a residing cell of the terminal device; and the terminal device is located in a predetermined area of the sixth network device.

Optionally, the receiving module 420 is further arranged to receive power information used for indicating transmitting power of the uplink sequence; and the transmitting module 410 is specifically arranged to transmit the uplink sequence according to the power information.

It shall be understood that the terminal device 400 is embodied in the form of functional modules. The term "module" may refer to an Application Specific Integrated Circuit (ASIC), an electronic circuit, a processor (such as a shared processor, a proprietary processor or a group processor) for executing one or more software or firmware programs, a memory, a merged logic circuit, and/or other suitable components supporting the described functions. In an optional example, one skilled in the art can understand that the terminal device 400 may be a terminal device in the communication methods of the above-described implementations, and the terminal device 400 may be arranged to execute various processes and/or acts corresponding to the terminal device in the above-described method implementations, which is not repetitively described here for the sake of avoiding repetition.

Figure 5:
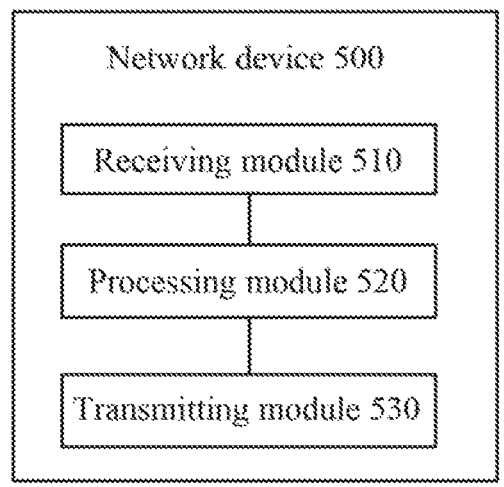
FIG. 5 illustrates a schematic diagram of a network device according to an implementation of the present disclosure.

FIG. 5 illustrates a schematic diagram of an information network device 500 according to an implementation of the present disclosure. As illustrated in FIG. 5, the network device 500 comprises: a receiving module 510 arranged to receive a predetermined uplink sequence transmitted by a terminal device, the uplink sequence is used for indicating that the terminal device has a demand for determining a target network device; a processing module 520 arranged to determine to transmit a first downlink message to the terminal device according to the uplink sequence, when the processing module 520 determines that the target network device is a first network device according to location information of the terminal device, the first downlink message is used for identifying the first network device; and a transmitting module 530 arranged to transmit the first downlink message, such that the terminal device determines that the target network device is the first network device according to the first downlink message.

Optionally, the processing module 520 is further arranged to acquire location information of the terminal device.

Optionally, the processing module 520 is specifically arranged to acquire actual location information of the terminal device transmitted by the terminal device, the actual location information is used for indicating the location of the terminal device, and the location information comprises the actual location information.

Optionally, the processing module 520 is specifically arranged to determine reference location information of the terminal device by acquiring receiving time points when a plurality of second network devices receive the uplink sequence and/or path losses of receiving the uplink sequence by a plurality of third network devices, and the location information comprises the reference location information.

Optionally, when the processing module 520 determines that the terminal device needs to measure a downlink reference signal, the first downlink message is used for instructing the terminal device to measure the downlink reference signal transmitted by each fourth network device of a plurality of fourth network devices.

Optionally, the plurality of fourth network devices comprises the network device; and the transmitting module 530 is further arranged to transmit the downlink reference signal.

Optionally, before the receiving module 510 receives the predetermined uplink sequence transmitted by the terminal device, the transmitting module 530 is further arranged to transmit the downlink reference signal at a first density; and after the receiving module 510 receives the predetermined uplink sequence transmitted by the terminal device, the transmitting module 530 is specifically arranged to transmit the downlink reference signal at a second density, wherein the second density is greater than the first density.

Optionally, the receiving module 510 is further arranged to receive a measurement report transmitted by the terminal device, wherein the measurement report is used for indicating a measurement result of measuring the downlink reference signal transmitted by each fourth network device by the terminal device; the processing module 520 is specifically arranged to determine that a seventh network device in the network system is the target network device according to the measurement report; and the transmitting module 530 is further arranged to transmit a second downlink message to the terminal device, wherein the second downlink message is used for identifying the seventh network device, such that the terminal device determines that the seventh network device is the target network device according to the second downlink message.

Optionally, the first downlink message comprises resource information and/or parameter information, wherein the resource information is used for indicating a resource occupied by each fourth network device for transmitting the downlink reference signal, and the parameter information is used for indicating parameters used by each fourth network device for transmitting the downlink reference signal.

Optionally, the first downlink message comprises indication information used for indicating the terminal device, such that the terminal device in an idle state determines that the first downlink message belongs to the terminal device according to the indication information.

Optionally, the indication information comprises the uplink sequence or an index of the uplink sequence.

Optionally, the receiving module 510 is further arranged to receive actual location information transmitted by the terminal device and used for indicating the location of the terminal device, wherein the indication information comprises the actual location information; and/or receiving identification information transmitted by the terminal device and used for identifying the terminal device, wherein the indication information comprises the identification information.

Optionally, the transmitting module 530 is further arranged to transmit power information used for indicating transmitting power of the uplink sequence to the terminal device.

It shall be understood that the network device 500 is embodied in the form of functional modules. The term "module" may refer to an Application Specific Integrated Circuit (ASIC), an electronic circuit, a processor (such as a shared processor, a proprietary processor or a group processor) for executing one or more software or firmware programs, and a memory, a merged logic circuit, and/or other suitable components supporting the described functions. In an optional example, one skilled in the art can understand that the network device 500 may be a network device (or a network system) in the above-described implementations, and the network device may be used for executing various processes and/or acts corresponding to the network device in the above-described method implementations, which is not repetitively described here for the sake of avoiding repetition.

Figure 6:
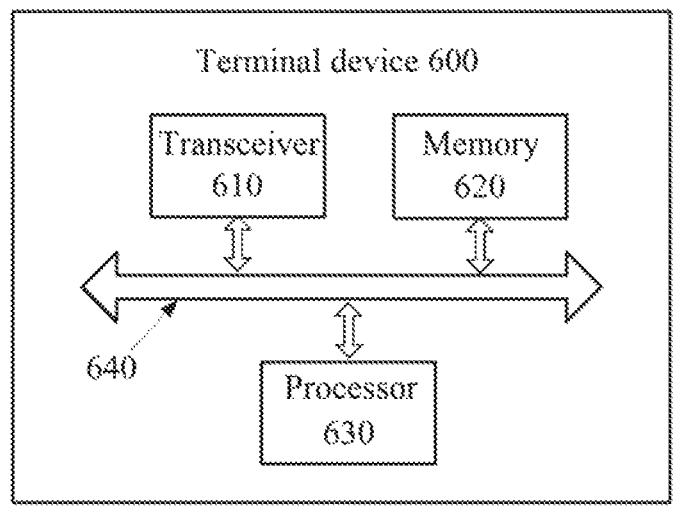
FIG. 6 illustrates a schematic diagram of a terminal device according to another implementation of the present disclosure.

FIG. 6 illustrates a schematic diagram of a terminal device 600 according to an implementation of the present disclosure. As illustrated in FIG. 6, the terminal device comprises: a transceiver 610, a memory 620, and a processor 630. The memory 620 is arranged to store program instructions. The processor 630 may call the program instructions stored in the memory 620. The processor 630 may control the transceiver 610 to receive or transmit information, and optionally, the terminal device 600 further comprises a bus system 640 that interconnects the processor 630, the memory 620 and the transceiver 610.

The transceiver 610 is arranged to transmit a predetermined uplink sequence, wherein the uplink sequence is used for indicating that the terminal device has a demand for determining a target network device.

The transceiver 610 is further arranged to receive a first downlink message transmitted by a network system according to the uplink sequence.

The processor 630 is arranged to call the instructions stored in the memory 620 to execute the following operation: when the first downlink message is used for identifying a first network device, determining that the target network device is the first network device according to the first downlink message, wherein the first network device is determined by the network system according to location information of the terminal device.

Optionally, the location information comprises actual location information received by the network system from the terminal device, wherein the actual location information is used for indicating the location of the terminal device; or the location information comprises reference location information of the terminal device determined by the network system according to receiving time points when a plurality of second network devices in the network system receive the uplink sequence and/or path losses of receiving the uplink sequence by a plurality of third network devices in the network system.

Optionally, when the first downlink message is used for instructing the terminal device to measure a downlink reference signal transmitted by each fourth network device of a plurality of fourth network devices in the network system, the processor 630 is specifically arranged to determine the target network device by measuring the downlink reference signal transmitted by each fourth network device.

Optionally, before the transceiver 610 transmits the predetermined uplink sequence, the transceiver 610 is further arranged to receive the downlink reference signal transmitted by a plurality of fifth network devices in the network system at a first density; the transceiver 610 is further arranged to transmit the uplink sequence when a trigger condition is satisfied; and the processor 630 is specifically arranged to determine the target network device by measuring the downlink reference signal transmitted by each fourth network device at a second density, wherein the second density is greater than the first density.

Optionally, the processor 630 is further arranged to measure the downlink reference signal transmitted by each fourth network device and generate a measurement report; the transceiver 610 is further arranged to transmit the measurement report to a sixth network device in the network system, wherein the six network device comprises a network device in a serving cell of the terminal device; the transceiver 610 is further arranged to receive a second downlink message transmitted by the sixth network device according to the measurement report, wherein the second downlink message is used for identifying a seventh network device; and the processor 630 is specifically arranged to determine that the seventh network device is the target network device according to the second downlink message.

Optionally, the first downlink message comprises resource information and/or parameter information, wherein the resource information is used for indicating a resource occupied by each fourth network device for transmitting the downlink reference signal, and the parameter information is used for indicating parameters used by each fourth network device for transmitting the downlink reference signal; and the processor 630 is specifically arranged to measure the downlink reference signal transmitted by each fourth network device according to the resource information and/or parameter information to determine the target network device.

Optionally, the first downlink message comprises indication information used for indicating the terminal device, such that the terminal device in an idle state determines that the first downlink message belongs to the terminal device according to the indication information.

Optionally, the indication information comprises the uplink sequence or an index of the uplink sequence.

Optionally, before the transceiver 610 receives the first downlink message transmitted by the network system according to the uplink sequence, the transceiver 610 is further arranged to transmit actual location information used for indicating the location of the terminal device, wherein the indication information comprises the actual location information; and/or transmit identification information used for identifying the terminal device, wherein the indication information comprises the identification information.

Optionally, the transceiver 610 transmits the actual location information used for indicating the location of the terminal device, such that the network system determines that the target network device is the first network device or determines that the terminal device needs to measure the downlink reference signal according to the actual location information.

Optionally, the transceiver 610 is specifically arranged to transmit the uplink sequence when a trigger condition is satisfied, wherein the trigger condition comprises at least one of the following conditions: receiving power of receiving the downlink signal transmitted by the sixth network device in the network system by the transceiver 610 is smaller than a power threshold; the sixth network device comprises a network device in a serving cell of the terminal device or a network device in a residing cell of the terminal device; and the terminal device is located in a predetermined area of the sixth network device.

Optionally, the transceiver 610 is further arranged to receive power information used for indicating transmitting power of the uplink sequence; and the transceiver 610 is specifically arranged to transmit the uplink sequence according to the power information.

It shall be understood that the terminal device 600 may be specifically a terminal device in the above-described implementations and may be arranged to execute various acts and/or processes corresponding to the terminal device in the above-described method implementations. Optionally, the memory 620 may include a read-only memory and a random access memory, and provide instructions and data to the processor. A part of the memory may include a non-volatile random access memory. For example, the memory may store information about device types. The processor 630 may be arranged to execute the instructions stored in the memory, and when the processor executes the instructions, the processor may execute the acts corresponding to the terminal device in the above-described method implementations.

Figure 7:
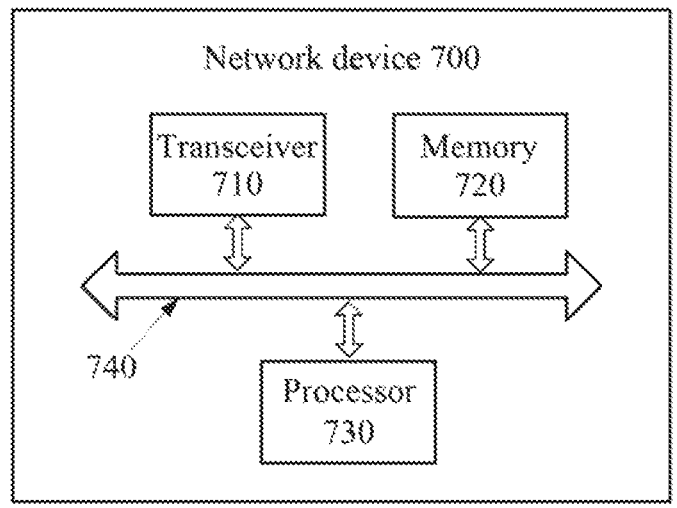
FIG. 7 illustrates a schematic diagram of a network device according to another implementation of the present disclosure.

FIG. 7 illustrates a schematic diagram of a network device according to an implementation of the present disclosure. As illustrated in FIG. 7, the network device comprises: a transceiver 710, a memory 720, and a processor 730. The memory 720 is arranged to store program instructions. The processor 730 may call the program instructions stored in the memory 720. The processor 730 may control the transceiver 710 to receive or transmit information (signals), and optionally the terminal device further comprises a bus system 740 that interconnects the processor 730, the memory 720 and the transceiver 710.

The transceiver 710 is arranged to receive a predetermined uplink sequence transmitted by a terminal device, wherein the uplink sequence is used for indicating that the terminal device has a demand for determining a target network device.

The processor 730 is arranged to determine to transmit a first downlink message to the terminal device according to the uplink sequence, when the processor 730 determines that the target network device is a first network device according to location information of the terminal device, and the first downlink message is used for identifying the first network device.

The transceiver 710 is arranged to transmit the first downlink message, such that the terminal device determines that the target network device is the first network device according to the first downlink message.

Optionally, the processor 730 is further arranged to acquire location information of the terminal device.

Optionally, the location information comprises actual location information transmitted by the terminal device and used for indicating the location of the terminal device.

Optionally, the processor 730 is specifically arranged to determine reference location information of the terminal device by acquiring receiving time points when a plurality of second network devices receive the uplink sequence and/or path losses of receiving the uplink sequence by a plurality of third network devices, and the location information comprises the reference location information.

Optionally, when the processor 730 determines that the terminal device needs to measure a downlink reference signal, the first downlink message is used for instructing the terminal device to measure the downlink reference signal transmitted by each fourth network device of a plurality of fourth network devices.

Optionally, the plurality of fourth network devices comprises the network device, and the transceiver 710 is further arranged to transmit the downlink reference signal.

Optionally, before the transceiver 710 receives the predetermined uplink sequence transmitted by the terminal device, the transceiver 710 is further arranged to transmit the downlink reference signal at a first density; and after the transceiver 710 receives the predetermined uplink sequence transmitted by the terminal device, the transceiver 710 is specifically arranged to transmit the downlink reference signal at a second density, wherein the second density is greater than the first density.

Optionally, the transceiver 710 is further arranged to receive a measurement report transmitted by the terminal device, wherein the measurement report is used for indicating a measurement result of measuring the downlink reference signal transmitted by each fourth network device by the terminal device; the processor 730 is specifically arranged to determine that a seventh network device in the network system is the target network device according to the measurement report; and the transceiver 710 is further arranged to transmit a second downlink message to the terminal device, wherein the second downlink message is used for identifying the seventh network device, such that the terminal device determines that the seventh network device is the target network device according to the second downlink message.

Optionally, the first downlink message comprises resource information and/or parameter information, wherein the resource information is used for indicating a resource occupied by each fourth network device for transmitting the downlink reference signal, and the parameter information is used for indicating parameters used by each fourth network device for transmitting the downlink reference signal.

Optionally, the first downlink message comprises indication information used for indicating the terminal device, such that the terminal device in an idle state determines that the first downlink message belongs to the terminal device according to the indication information.

Optionally, the indication information comprises the uplink sequence or an index of the uplink sequence.

Optionally, the transceiver 710 is further arranged to receive actual location information transmitted by the terminal device and used for indicating the location of the terminal device, wherein the indication information comprises the actual location information; and/or receive identification information transmitted by the terminal device and used for identifying the terminal device, wherein the indication information comprises the identification information.

Optionally, the transceiver 710 is further arranged to transmit power information used for indicating transmitting power of the uplink sequence to the terminal device.

It shall be understood that the network device 700 may be specifically the first network device (or a network device in the network system) in the above-described implementations and may be arranged to execute various acts and/or processes corresponding to the network device in the above-described method implementations. Optionally, the memory 720 may include a read-only memory and a random access memory, and provide instructions and data to the processor. A part of the memory may include a non-volatile random access memory. For example, a memory may store information about device types. The processor 730 may be arranged to execute the instructions stored in the memory, and when the processor executes the instructions, the processor may execute the acts corresponding to the network device (or a network device in the network system) in the above-described method implementations.

In the implementations of the present disclosure, the processor may be a Central Processing Unit (CPU), a Network Processor (NP), or a combination of CPU and NP. The processor may include a hardware chip. The hardware chip may be an Application-Specific Integrated Circuit (ASIC), a Programmable Logic Device (PLD) or a combination thereof. The PLD may be a Complex Programmable Logic Device (CPLD), a Field-Programmable Gate Array (FPGA), a Generic Array Logic (GAL), or any combination thereof.

The transceiver can realize communication between a mobile terminal device and another device or a communication network.

The memory may include a read-only memory and a random access memory, and provide instructions and data to the processor 320. A part of the memory may include a non-volatile random access memory. For example, the memory may store information about device types.

The bus system includes not only a data bus, but also a power bus, a control bus and a state signal bus. For ease of denotation, only one thick line is used to represent the bus system in the drawings, but it does not imply that there is only one bus or one type of bus.

It shall be understood that, in the implementations of the present disclosure, "B corresponding to A" means that B is associated with A, and B can be determined according to A. However, it shall be understood that determining B according to A does not mean determining B only according to A, but may determine B according to A and/or other information. It shall be understood that the term "and/or" herein is merely a description of the association relationship between associated objects, indicating that there may be three kinds of relationships, for example, A and/or B may represent that: A exists alone, both A and B exist, and B exists alone. In addition, the character "/" herein generally indicates that the associated objects have a relationship of "or".

It shall also be understood that, in various implementations of the present disclosure, the values of the sequence numbers of the above-described processes do not imply the order of execution, and the order of execution of each process should be determined by its function and inherent logic, without constituting any limitation to the implementation process of the implementations of the present disclosure.

One skilled in the art may realize that units and algorithm acts of the various examples described in connection with the implementations disclosed herein can be implemented in electronic hardware, or a combination of computer software and electronic hardware. Whether these functions are implemented in hardware or software depends on the specific application and design constraints of the technical solution. Professionals and technicians may implement the described functions by different ways for various particular applications, but the implementations should not be considered beyond the scope of the present disclosure.

One skilled in the art may clearly understand that, for the convenience and simplicity of the description, the specific working processes of the systems, devices and units described above may refer to corresponding processes in the above-described method implementations, which are not repetitively described herein.

In several implementations provided in the present application, it shall be understood that the disclosed systems, devices and methods may be implemented in other ways. For example, the device implementations described above are only schematic, for example, the division of the units is only a logical functional division and there may be another way of dividing in actual implementation, for example, a plurality of units or components may be combined or integrated into another system, or some features may be ignored or not executed. Another point is that mutual coupling or direct coupling or communication connection shown or discussed above may be indirect coupling or communication connection through some interfaces, devices or units, and may be electrical, mechanical or in other forms.

The unit described as a separate component may, or may not be physically separated, and the component displayed as a unit may, or may not be a physical unit, i.e., it may be located in one place, or may be distributed over a plurality of network units. Some or all of the units may be selected according to actual needs to achieve the purposes of the implementations.

In addition, each functional unit in each implementation of the present disclosure may be integrated in a processing unit, each unit may exist physically, or two or more than two units may be integrated in one unit.

The technical features and description in an implementation above, to make the application document concise and clear, may be understood as applicable to other implementations, e.g., the technical features of a method implementation may be applied to the device implementations or other method implementations, which will not be repetitively described in other implementations one by one.

When the functions are implemented in the form of software functional units and sold or used as separate products, the functions may be stored in a computer-readable storage medium. Based on such understanding, the technical solution of the present disclosure substantively, or a part which makes a contribution to the prior art or a part of the technical solution may be embodied in the form of a software product, which is stored in a storage medium and comprises instructions for making a computer device (which may be a personal computer, a server, or a network device) perform all or part of the acts of the methods described in various implementations of the present disclosure. The above-mentioned storage medium includes a U disk, a mobile hard disk, a Read-Only Memory (ROM), a Random Access Memory (RAM), a disk or a CD-ROM and other mediums that can store program codes.

What are described above are only exemplary implementations of the present disclosure, but the protection scope of the present disclosure is not limited thereto. Within the technical scope disclosed herein, any one skilled in the art may easily conceive variations or substitutions that shall be covered by the protection scope of the present disclosure. Therefore, the protection scope of the present disclosure shall be determined by the protection scope of the claims.

What I claim is:

1. A communication method, comprising:
   transmitting, by a terminal device, a predetermined uplink sequence, the uplink sequence being used for indicating that the terminal device has a demand for determining a target network device;
   receiving, by the terminal device, a first downlink message transmitted by a network system according to the uplink sequence; and
   when the first downlink message is used for identifying a first network device, determining, by the terminal device, that the target network device is the first network device according to the first downlink message, wherein the first network device is determined by the network system according to location information of the terminal device;
   wherein, when the first downlink message is used for instructing the terminal device to measure a downlink reference signal transmitted by each second network device of a plurality of second network devices in the network system,
   the terminal device determines the target network device by measuring the downlink reference signal transmitted by the each second network device.

2. The communication method according to claim 1, wherein the location information comprises actual location information received by the network system from the terminal device, the actual location information being used for indicating a location of the terminal device; or
   the location information comprises reference location information of the terminal device determined by the network system according to receiving time points when a plurality of third network devices in the network system receive the uplink sequence, or according to path losses of receiving the uplink sequence by a plurality of fourth network devices in the network system, or according to the receiving time points when the plurality of third network devices in the network system receive the uplink sequence and the path losses of receiving the uplink sequence by the plurality of fourth network devices in the network system.

3. The communication method according to claim 1, wherein, before the terminal device transmits the predetermined uplink sequence, the communication method further comprises:
   receiving, by the terminal device, the downlink reference signal transmitted by at least one fifth network device in the network system at a first density;
   wherein transmitting, by the terminal device, the predetermined uplink sequence comprises:
   transmitting, by the terminal device, the uplink sequence when a trigger condition is satisfied; and
   wherein determining, by the terminal device, the target network device by measuring the downlink reference signal transmitted by the each second network device comprises:
   determining, by the terminal device, the target network device by measuring the downlink reference signal transmitted by the each second network device at a second density, the second density being greater than the first density.

4. The communication method according to claim 1, wherein determining, by the terminal device, the target network device by measuring the downlink reference signal transmitted by the each second network device comprises:
   measuring, by the terminal device, the downlink reference signal transmitted by the each second network device and generating a measurement report;
   transmitting, by the terminal device, the measurement report to a sixth network device in the network system, the six network device being used for controlling a serving cell of the terminal device;

receiving, by the terminal device, a second downlink message transmitted by the sixth network device according to the measurement report, the second downlink message being used for identifying a seventh network device; and determining, by the terminal device, that the seventh network device is the target network device according to the second downlink message.

5. The communication method according to claim 1, wherein the first downlink message comprises resource information, or parameter information, or the resource information and the parameter information, the resource information is used for indicating a resource occupied by the each second network device for transmitting the downlink reference signal, and the parameter information is used for indicating parameters used by the each second network device for transmitting the downlink reference signal;

wherein determining, by the terminal device, the target network device by measuring the downlink reference signal transmitted by the each second network device comprises:

measuring, by the terminal device, the downlink reference signal transmitted by the each second network device according to the resource information, or according to the parameter information, or according to the resource information and the parameter information, to determine the target network device.

6. The communication method according to claim 1, wherein the first downlink message comprises indication information used for indicating the terminal device, to enable the terminal device in an idle state to determine that the first downlink message belongs to the terminal device according to the indication information.

7. The communication method according to claim 6, wherein the indication information comprises the uplink sequence or an index of the uplink sequence.

8. The communication method according to claim 6, wherein, before the terminal device receives the first downlink message transmitted by the network system according to the uplink sequence, the communication method further comprises:

transmitting, by the terminal device, actual location information used for indicating a location of the terminal device, wherein the indication information comprises the actual location information;

or, transmitting, by the terminal device, identification information used for identifying the terminal device, wherein the indication information comprises the identification information;

or, transmitting, by the terminal device, actual location information used for indicating the location of the terminal device and identification information used for identifying the terminal device, wherein the indication information comprises the actual location information and the identification information.

9. The communication method according to claim 1, wherein the location information comprises actual location information, and the communication method further comprises: transmitting, by the terminal device, the actual location information used for indicating a location of the terminal device, to enable the network system to determine that the target network device is the first network device or determine that the terminal device needs to measure a downlink reference signal according to the actual location information.

10. The communication method according to claim 1, wherein transmitting, by the terminal device, the predetermined uplink sequence comprises:

transmitting, by the terminal device, the uplink sequence when a trigger condition is satisfied, wherein the trigger condition comprises at least one of following conditions:

receiving power of receiving a downlink signal transmitted by a sixth network device in the network system is smaller than a power threshold; and the sixth network device comprises a network device in a serving cell of the terminal device or a network device in a residing cell of the terminal device; and the terminal device is located in a predetermined area of the sixth network device.

11. The communication method according to claim 1, wherein the communication method further comprises:

receiving, by the terminal device, power information used for indicating transmitting power of the uplink sequence; and wherein transmitting, by the terminal device, the predetermined uplink sequence comprises:

transmitting, by the terminal device, the uplink sequence according to the power information.

12. A communication method, comprising:

receiving, by a network device, a predetermined uplink sequence transmitted by a terminal device, the uplink sequence being used for indicating that the terminal device has a demand for determining a target network device;

determining, by the network device, to transmit a first downlink message to the terminal device according to the uplink sequence, wherein when the network device determines that the target network device is a first network device according to location information of the terminal device, the first downlink message being used for identifying the first network device; and transmitting, by the network device, the first downlink message, to enable the terminal device to determine that the target network device is the first network device according to the first downlink message;

wherein, when the network device determines that the terminal device needs to measure a downlink reference signal, the first downlink message is used for instructing the terminal device to measure the downlink reference signal transmitted by each second network device of a plurality of second network devices.

13. The communication method according to claim 12, wherein the communication method further comprises:

acquiring, by the network device, the location information of the terminal device.

14. A terminal device, comprising a processor, a transceiver and a memory, the memory is arranged to store instructions, the processor is arranged to execute the instructions stored in the memory to control the transceiver to receive or transmit signals, wherein:

the transceiver is arranged to transmit a predetermined uplink sequence, the uplink sequence being used for indicating that the terminal device has a demand for determining a target network device;

the transceiver is further arranged to receive a first downlink message transmitted by a network system according to the uplink sequence; and the processor is arranged to execute the instructions stored in the memory to execute the following operation: when the first downlink message is used for identifying a first network device, determine that the target network device is the first network device according to the first downlink message, wherein the first network device is determined by the network system according to location information of the terminal device;

wherein, when the first downlink message is used for instructing the terminal device to measure a downlink reference signal transmitted by each second network device of a plurality of second network devices in the network system, the processor is specifically arranged to determine the target network device by measuring the downlink reference signal transmitted by the each second network device.

15. The terminal device according to claim 14, wherein the location information comprises actual location information received by the network system from the terminal device, the actual location information being used for indicating a location of the terminal device; or the location information comprises reference location information of the terminal device determined by the network system according to receiving time points when a plurality of third network devices in the network system receive the uplink sequence, or according to path losses of receiving the uplink sequence by a plurality of fourth network devices in the network system, or according to the receiving time points when the plurality of third network devices in the network system receive the uplink sequence and the path losses of receiving the uplink sequence by the plurality of fourth network devices in the network system.

16. The terminal device according to claim 14, wherein, the transceiver is further arranged to receive, before transmitting the predetermined uplink sequence, the downlink reference signal transmitted by a plurality of fifth network devices in the network system at a first density;

the transceiver is specifically arranged to transmit the uplink sequence when a trigger condition is satisfied; and the processor is specifically arranged to determine the target network device by measuring the downlink reference signal transmitted by the each second network device at a second density, the second density being greater than the first density.

17. The terminal device according to claim 14, wherein the processor is further arranged to:

measure a downlink reference signal transmitted by each second network device and generate a measurement report;

the transceiver is further arranged to transmit the measurement report to a sixth network device in the network system, wherein the sixth network device comprises a network device in a serving cell of the terminal device;

the transceiver is further arranged to receive a second downlink message transmitted by the sixth network device according to the measurement report, the second downlink message being used for identifying a seventh network device; and the processor is specifically arranged to determine that the seventh network device is the target network device according to the second downlink message.

18. The terminal device according to claim 14, wherein the first downlink message comprises resource information, or parameter information, or the resource information and the parameter information, the resource information is used for indicating a resource occupied by the each second network device for transmitting the downlink reference signal, and the parameter information is used for indicating parameters used by the each second network device for transmitting the downlink reference signal; and the processor is specifically arranged to measure the downlink reference signal transmitted by the each second network device according to the resource information, or according to the parameter information, or according to the resource information and the parameter information, to determine the target network device.

* * * * *